Nov. 29, 1966 A. L. NASVYTIS 3,287,986
MULTIROLLER DRIVE ASSEMBLY AND DISENGAGING APPARATUS
Filed Jan. 16, 1964 2 Sheets-Sheet 1
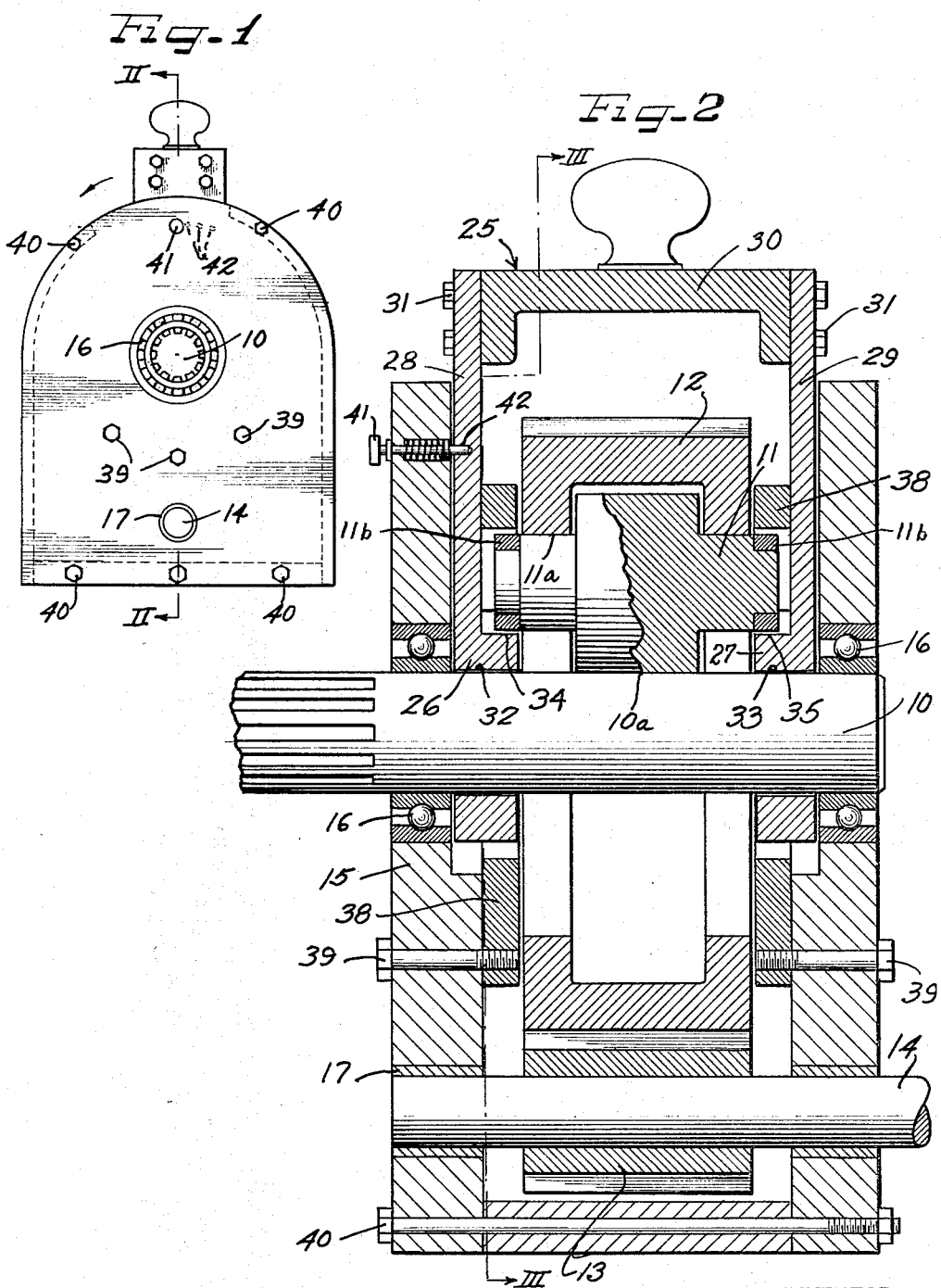
INVENTOR.
Algirdas L. Nasvytis
BY
ATTORNEYS Nov. 29, 1966   A. L. NASVYTIS   3,287,986
MULTIROLLER DRIVE ASSEMBLY AND DISENGAGING APPARATUS
Filed Jan. 16, 1964   2 Sheets-Sheet 2

INVENTOR.
Algirdas L. Nasvytis
BY
ATTORNEYS

United States Patent Office 3,287,986
Patented Nov. 29, 1966

3,287,986
MULTIROLLER DRIVE ASSEMBLY AND
DISENGAGING APPARATUS
Algirdas L. Nasvytis, Cleveland Ohio, assignor to
TRW Inc., a corporation of Ohio
Filed Jan. 16, 1964, Ser. No. 338,117
10 Claims. (Cl. 74—204)

The present invention relates to concentric gear devices and is more particularly concerned with the provision of a novel method of assembling multiroller friction concentric gear sets and a directly related improvement in concentric friction transmissions and disengageable power transmissions.

As those skilled in the art of planetary gearing of the friction type are aware, many systems of such planetary gearing have been constructed in the past. Multiroller planetary gearing of the friction type has, for example, been disclosed and claimed in my previous copending applications Serial No. 132,406, entitled "Compound Planetary Friction Drive," filed August 18, 1961, now Patent No. 3,216,285, and Serial No. 237,629, entitled "Toggle Action Planetary Friction Drive," filed November 14, 1962, respectively. In such friction gearing the components are preloaded to provide a predetermined amount of frictional contact between the friction drive rollers. In order for a friction drive planetary gear system to operate efficiently and to transmit high torques it is necessary that the preload be sufficient to provide positive drive without appreciable slipping up to the design torque limits. It has been found, however, that with planetary friction gearing designed to handle relatively heavy loads, the preloads have become an important consideration. It has been found to be quite difficult to assemble the planetary components with the proper amount of preload and, similarly, it is very difficult to disassemble such planetary systems. Additionally, it has become extremely difficult to determine the exact amount of preload present in any given installation and produce an assembled drive system having consistently the same preload value.

These same problems are, of course, met in drive systems in which the gear configuration is similar to planetary gearing, but in which the carrier is rigid and hence the carrier-mounted elements do not planetate. Such non-planetary drives employing a sun gear and a concentric ring gear and intermediate drive gears may be broadly and generically designated concentric drives with reference to the following description of the present invention. It will be understood that the term concentric drive is manifestly generically inclusive of such drives in which the carrier-mounted intermediate gear members are planetary as well as in which the carrier is fixed.

In accordance with the principles of the present invention, apparatus has been provided whereby concentric friction drive systems may readily be assembled or disassembled with exactly the amount of preload, in a simple and extremely rapid manner. In accordance with the principles of the present invention the task of assembling and disassembling the friction concentric system is greatly simplified, and extremely accurate determination of the frictional forces is possible.

Another problem constantly faced in the transmission field is one of simple clutching and declutching of mechanical drive components. In accordance with the principles of the present invention, an extremely simple drive disengaging arrangement is provided whereby friction concentric drive system may be engaged or disengaged at will without complicated drive components. The mechanism for assembly and disassembly of friction concentric gear systems may be retained in the system and employed, in accordance with the present invention, as a drive disengaging mechanism controlling the transmission and nontransmission of power through the concentric gear set.

It is, accordingly, an object of the present invention to provide an improved method and apparatus for assembling and disassembling friction-type concentric gear systems.

Still another object of the present invention is to provide an improved drive disengaging means for controlling the delivery of power by a planetary friction gear drive.

Still a further object of the present invention is to provide a greatly simplified system of assembling and calibrating friction drive systems.

A feature of the invention resides in the provision of a novel cam for separating, in a radial sense, concentric gear component from the sun gear of a concentric drive system.

Still another feature of the invention resides in providing a lever operable to engage or disengage a friction concentric gear system and simultaneously to determine the exact amount of preload in the system after assembly.

Still other and further objects and features of the present invention will at once become apparent from a consideration of the attached specification and drawings wherein an improved embodiment of the invention is shown by way of illustration only, and wherein:

FIGURE 1 is an end-elevational view of a transmission system embodying the principles of the present invention and assembled in accordance with the method thereof;

FIGURE 2 is a cross-sectional view taken along the line II—II of FIGURE 1 and illustrating the components of the drive system in cross-section.

As shown on the drawings:

Figure 3:
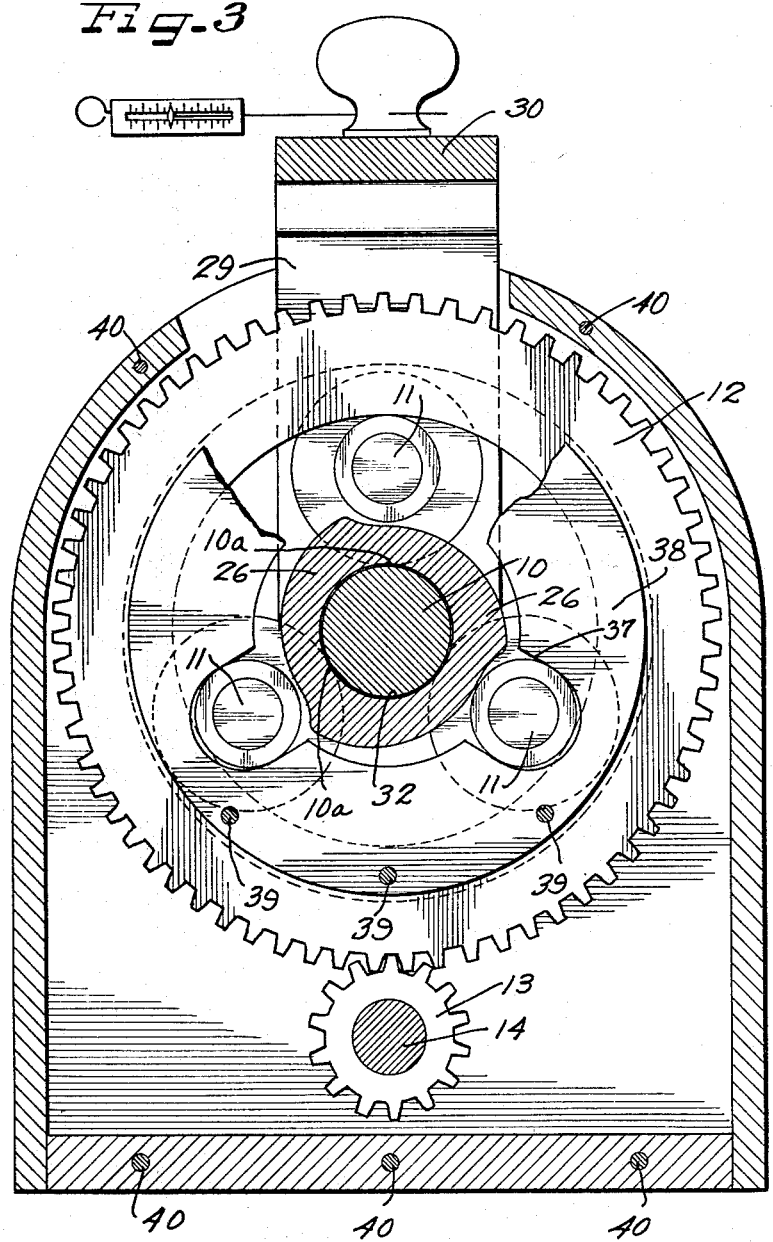
FIGURE 3 is a cross-sectional view taken along the line III—III of FIGURE 2 illustrating in more detail the structure and apparatus for performing the method of the present invention.

As may be seen from a consideration of FIGURES 1 and 2, a relatively elementary friction type concentric gear drive system is illustrated. It comprises a smooth cylindrical sun member 10, three roller elements 11 fixedly positioned for rotation about their own axes, a ring gear 12, an output gear 13, and output shaft 14. The sun 10 is mounted for rotation in fixed housing 15 by way of conventional ball bearings 16 and, similarly, the output shaft 14 is mounted for antifriction rotation in conventional bearings 17. Although the concentric gear reduction portions of the drive comprising the sun 10, roller elements 11 and ring gear 12 are in friction drive relation with each other, as shown at 10a and 11a, the output from the ring gear 12 to the output gear 13 is illustrated as positive gear toothed drive in the embodiment illustrated.

As above described, it will be clear that the drive system illustrated is conventional in its format. In order to transmit high torque by way of such a friction drive and planetary friction drives in which the carrier-mounted roller elements planetate, it is necessary to provide a preload condition at the friction surfaces. This preload must be sufficient to maintain contact between the rollers and sun even at high speeds and resulting high centrifugal forces. Further, it has been found in actual practice that the exact amount of preload is very important to efficiency of drive operation. In these circumstances, the problem of providing a predetermined, known, preload to a concentric gear system has been a long standing one in the art.

In the past, friction concentric drive systems have been extremely difficult to assemble, disassemble, and construct with accurately predetermined preloads. In order to provide the preload necessary in the assembled device, which in effect comprises an interference fit situation, various techniques have been employed. For example, the ring gear may be expanded by heating, or the sun 10 may be shrunk by cooling, or combinations of both these techniques may be used to permit a temporary loose fit relationship during assembly. Although these techniques are known and have been used with some success, serious disadvantages are present with them. In the first place, disassembly of the components by selective cooling and/or heating is extremely difficult with the parts in their assembled relation. Secondly, it is incredibly difficult to precisely calibrate, in advance of assembly, the amount of preload. This is true since expansion and contraction changes in the system are difficult to predict with absolute accuracy and may, in the process, slightly modify the physical characteristics of the components sufficient to modify, even if only slightly, the relatively critical final preload condition.

In accordance with the principles of the present invention, however, an extremely simple method has been devised for assembling concentric drive systems of the preloaded friction gear type. In accordance with this improved system, no temperature factors are involved. In addition, by means of the method and apparatus of the present invention, assembly and disassembly both may be readily accomplished without any difficulty whatsoever in a manner permitting even inexperienced assembly personnel to assemble concentric drive systems in a completely accurate and consistent manner.

As may be seen from a consideration of the drawings, a cam separator is generally indicated at 25. This separator comprises a matched pair of multi-lobe, generally spiral-shaped, cams 26 and 27 having extension lever portions 28 and 29 respectively secured to handle or actuator bar 30 by means of conventional bolts 31 or like devices. The internal diameters 32 and 33 of respective cams 26 and 27 are slightly larger than the sun 10 and are sufficiently large to permit passage of the sun 10 under any circumstances. In the illustration of FIGURE 2, the internal diameters 32 and 33 are shown as larger than the diameter of the sun 10 by an exaggerated amount, for purposes of clarity. In actual practice, however, the diameters 32 and 33 may be within a few thousandths of an inch of the outside diameter of the sun 10.

It will be apparent that upon oscillation of the handle 30 in the counterclockwise direction of the arrows shown in FIGURE 1, the cam surfaces 34 and 35 of the respective cams 26 and 27 will rise under the bushings 11b of of the rollers 11 forcing them radially outwardly in slots 37 of the fixed roller retainer plate 38 which is secured to the housing by way of bolts 39. Upon such movement of the handle 30, and its radially outward movement of the rollers 11, the sun 10 may be freely slid into or out of assembled relation with rollers. It has been found that radial movement of the rollers of only approximately .002 or .003 inch is sufficient even in a very large torque transmitting concentric gear.

By the application of a scale to the handle 30, the amount of load required to move the rollers 11 radially outwardly away from the sun sufficiently to permit the sun to be axially slid into or out of engagement with the rollers 11 may readily be observed. Accordingly, the amount of preload may in each instance be accurately observed in a simple manner by observance of the scale reading and knowledge of the angle of the cam risers employed. In initially assembling concentric drive systems in accordance with the present invention, it will be realized that very minute variations may be encountered in the dimensions of the ring gear surface, the roller diameters, and the diameter of the sun egar. These minute differences which will occur in all manufacturing processes, will, of course, effect a variation in the amount of preload in a given assembly. However, by utilization of the riser cams 26, 27 of the present invention, a correct match of appropriately sized sun may be employed to provide exactly the proper amount of preload. Thus, in assembly, should a selected drive sun be found, upon assembly by means of spreading the rollers 11, be too loose to provide the required preload, a very slightly larger diameter sun may be substituted. This selection and substitution may be accomplished in a manner of seconds without the necessity of heating, cooling, or in other ways affecting the sun, roller or ring components. As a result, accordingly, an extremely accurate assembly is readily accomplished in an absolute minimum of time.

It will be observed that in the embodiment illustrated, the cams 26 and 27 may be removed from the assembled construction by disassembly of the bolts 31 and disassembly of the housing bolts 40. However, in some installations it may be desirable to leave the cams 26 and 27 permanently in place for simplification of disassembly and repair. The cams may be retained in an inoperative condition in which the cam surfaces 34 and 35 are out of contact with the rollers 11 by means of a spring pressed detent 41. The detent 41 may also, in combination with a plurality of apertures 42 in lever 28, be employed for maintaining the handle 30 in position of roller release.

As noted above, the handle 30 may be maintained in a condition in which the rollers 11 do not contact the sun. It will be manifest, accordingly, that in such condition no drive could possibly be transmitted from the sun 10 to the output shaft 14, or vice versa. Accordingly, it will be apparent that by manipulation of the handle 30 an engaged or disengaged condition may readily be accomplished. Thus, where it is desired that a simple drive-disengaging construction be provided in a concentric gear drive system, the cam riser combination above illustrated and described may readily be employed as a power transmission disengager which may be operated manually by manipulation of the handle 30 counterclockwise, in FIGURES 1 and 3, to disengage and a clockwise return to engagement. Of course, the handle 30 may, if desired, be actuated by any remote power actuated control system, such as a hydraulic cylinder or the like secured to levers 28, 29 or the operating member 30.

In the illustrated embodiment, the concentric gear drive system is of a simple arrangement employing only a single set of rollers 11. It will be apparent, however, that a plurality of rows of rollers in frictional engagement may just as readily be employed. For example, multiroller planetary or concentric gear systems of the type described in my above-identified copending applications may be assembled and disassembled by means of the same riser cam described in the present invention. This is true since the cam need only act on an axial extension of the innermost row of planets or rollers to radially separate them from the sun gear in order to provide simple assembly and disassembly. The same is true, of course, with respect to the drive-disengaging action so that in spite of the complexity of the friction drive system, the simplicity of the assembling device or the disengager may be identical in all cases.

From the above it will be seen that I have provided an improved and novel method of assembling and disassembling, as well as assembly matching, concentric drive systems. It will be further understood that in accordance with the principles of the present invention, a simplified concentric drive disengager has been provided. Variations and modifications will at once occur to those skilled in the art and it is, accordingly, my intention that the scope of the present invention be limited solely by that of the hereinafter appended claims.

I claim as my invention:

1. In combination in a friction concentric gear system, a sun member, a plurality of intermediate roller members and a ring member wherein said roller members are in preloaded friction drive relationship with said sun member and ring member when in assembled drive relation, and cam means located inwardly of said roller members and having surface means contacting and simultaneously moving said roller members generally radially outwardly away from said sun member whereby said preloaded friction drive relationship between said sun and roller members is interrupted.

2. In combination in a friction concentric gear system, a sun member, a plurality of intermediate roller members and a ring member wherein said roller members are in preloaded friction drive contact with said sun and ring members when in assembled drive relation, and cam means located inwardly of said roller members and having surface means contacting and simultaneously moving said roller members generally radially outwardly away from said sun member whereby said preloaded friction drive contact between said sun and roller members is interrupted.

3. The method of assembling a concentric friction drive transmission having a sun member, a plurality of intermediate roller members at least some of which are in preloaded interfence fit relation with said sun member when assembled therewith, and a ring member in preloaded interference fit with at least some of said roller members when in assembled relationship comprising simultaneously applying a generally radial force against said roller members in contact with said sun member when in assembled relationship to force them radially outwardly whereby said sun member may be freely axially inserted within said roller members, and releasing said force to cause said roller members to contact said sun member in preloaded friction drive relationship.

4. The method of determining exactly the amount of preload in a friction concentric gear transmission having a sun member, a plurality of intermediate roller members and a ring member assembled in an interference friction fit relationship which comprises radially outwardly spreading said roller members away from and independently of said sun member an amount just sufficient to permit axial movement of said sun member relative to said roller members and transmitting the force for such movement of roller members via means movable in direct relation into the amount of preload applied thereby, and measuring the amount of such movement.

5. In combination in a friction concentric gear system, a sun member, a plurality of intermediate roller members and a ring member wherein at least some of said roller members are in preloaded friction drive relationship with said sun and at least some of said roller members are in preloaded friction drive relationship with said ring member when in assembled drive relation, and cam means located radially inwardly of said roller members and having surface means contacting and simultaneously moving said roller members in friction drive relation with said sun radially outwardly away from said sun member whereby said preloaded friction drive relationship between said sun member and the roller members normally in contact therewith is interrupted.

6. In combination in a friction concentric gear system, a sun member, a plurality of intermediate roller members and a ring member wherein at least some of said roller members are in preloaded friction contact with said sun member and at least some of said roller members are in preloaded friction contact with said ring member when in assembled drive relation, and multi-lobed cam means positioned radially inwardly of said roller members in contact with said sun member, said cam means having the lobes thereof in a generally helical configuration whereby rotation of said cam means about the axis of the sun member will force the roller members in contact with said sun member generally radially outwardly away from said sun member whereby said friction contact between said sun member and the roller members is interrupted.

7. In combination in a friction concentric gear system, a sun member, a plurality of intermediate roller members and a ring member wherein said roller members, ring member and sun member are in preloaded friction drive relationship when assembled, disengaging means for interrupting said friction drive relationship comprising cam lifting means contacting roller members in contact with said sun member at surfaces facing radially inwardly, and actuating means moving said cam means to force the roller members contacted thereby radially outwardly away from said sun member.

8. In combination in a friction concentric gear system, a sun member, a plurality of intermediate roller members and a ring member wherein said roller members, ring member and sun member are in preloaded friction drive relationship when assembled, disengaging means for interrupting said friction drive relationship comprising cam lifting means contacting roller members in contact with said sun member at surfaces facing radially inward, actuating means moving said cam means to force the roller members contacted thereby radially outwardly away from said sun member, and means for maintaining said cam member in the last named position.

9. The method of determining exactly the amount of interference preload in a friction concentric gear transmission having a sun member, a plurality of intermediate roller members, and a ring member assembled in an interference friction fit drive relationship, which comprises moving said roller members in contact with said sun member generally outwardly away from said sun member independently of said sun member by an amount just sufficient to permit axial movement of said sun member relative to said roller members, and transmitting the force for such movement of the roller members via force measuring means.

10. In combination in a friction concentric gear system, a sun member, a plurality of intermediate roller members and a ring member wherein said roller members, ring member and sun member are in preloaded friction drive relationship when assembled, disengaging means for interrupting said friction drive relationship comprising cam lifting means contactng roller members in contact with said sun member at surfaces facing radially inwardly toward said sun member, actuating means moving said cam means to force the roller members contacted thereby outwardly away from said sun member, and input and output drive means connected respectively to two of said members.

References Cited by the Examiner

UNITED STATES PATENTS

| 495,806 | 4/1893 | Holderman | 74—205 |
|---|---|---|---|
| 718,922 | 1/1903 | Dow et al. | 74—213 |
| 827,204 | 7/1906 | Bauch | 74—211 |
| 1,446,347 | 2/1923 | Hort | 74—204 |

FOREIGN PATENTS 481,891  3/1952  Canada.

DAVID J. WILLIAMOWSKY, Primary Examiner.

DON A. WAITE, Examiner.

L. H. GERIN, Assistant Examiner.